United States Patent [19]

Ross et al.

[11] Patent Number: 4,908,338

[45] Date of Patent: Mar. 13, 1990

[54] DRIED EMULSION CERAMIC PROCESS

[75] Inventors: Sidney D. Ross, Williamstown; Galeb H. Maher, North Adams, both of Mass.; Clinton E. Hutchins, Pownal, Vt.

[73] Assignee: Sprague Electric Company, North Adams, Mass.

[21] Appl. No.: 196,515

[22] Filed: May 20, 1988

Related U.S. Application Data

[63] Continuation-in-part of Ser. No. 947,117, Dec. 29, 1986, Pat. No. 4,749,664.

[51] Int. Cl.$^4$ .............................................. C04B 35/00
[52] U.S. Cl. ............................................. 501/1; 501/134; 501/137; 501/26
[58] Field of Search ................... 501/136, 137, 1, 138, 501/139, 134, 26

[56] References Cited

U.S. PATENT DOCUMENTS

| | | | |
|---|---|---|---|
| 3,330,697 | 7/1967 | Pechini | 117/215 |
| 3,647,364 | 3/1972 | Mazdiyasni et al. | 23/51 R |
| 3,717,487 | 2/1973 | Hurley et al. | 106/48 |
| 4,081,857 | 3/1978 | Hanold | 361/321 |
| 4,582,814 | 4/1986 | Thomas | 501/136 |
| 4,640,905 | 2/1987 | Burn | 501/136 X |
| 4,654,075 | 3/1987 | Cipollini | 75/0.5 A |
| 4,749,664 | 6/1988 | Ross et al. | 501/1 |
| 4,845,062 | 7/1989 | Burn | 501/137 X |

FOREIGN PATENT DOCUMENTS 2032233  1/1971  Fed. Rep. of Germany.

*Primary Examiner*—Mark L. Bell
*Assistant Examiner*—Karl Group

[57] ABSTRACT

Dried emulsion of precursors for ceramic additives are added to paints containing fine particle ceramic materials for use in ceramic capacitors. The precursors are converted into the desired additives in the paints during the sintering of the capacitor bodies.

3 Claims, No Drawings

DRIED EMULSION CERAMIC PROCESS

CROSS-REFERENCE TO RELATED APPLICATION

This invention is a continuation-in-part of our application Ser. No. 947,117 filed Dec. 29, 1986 which issued on June 7, 1988 as U.S. Pat. No. 4,749,664.

BACKGROUND OF THIS INVENTION

This invention relates to a dried emulsion process for introducing additives into ceramic materials so as to obtain particular properties in ceramic bodies made from those materials.

It is common practice in manufacturing electronic ceramics to incorporate additives into the ceramic body to obtain certain desirable properties in the finished material These additives may shift the Curie temperature to a higher or lower value; they may promote grain growth or inhibit it; they may help to adjust and control the temperature coefficient of capacity; they may serve as a flux and lower the sintering temperature. The variables involved are not all independent of one another, and a single additive will frequently function in more than one mode. These additives are added in small amounts, frequently as little as 1 or 2% of the total ceramic weight, and only rarely in excess of 5% of the ceramic weight.

These additives are commonly added in the prior art as calcined oxides. Where the major ceramic components are present as fine particle ceramics in our ceramic paints it is essential that all additives used also be in fine particle form. This is necessary to ensure adequate mixing and a uniform, homogeneous structure in the final ceramic matrix. It is possible to follow the teachings of Cipollini in U.S. Pat. No. 4,654,075 and our above-identified parent application Ser. No. 947,117 (issued June 7, 1988 as U.S. Pat. No. 4,749,664) to prepare these additives in fine powder form.

It is an object of this invention to provide a process for introducing additives into fine powder ceramic materials which offers better chemical control and significant savings in cost.

It is an object of this invention to provide a process for introducing additives into fine powder ceramic materials in other than calcined oxide form.

Another feature of this invention is to provide a process for introducing additives into fine powder ceramic materials in the form of precursors of the additives.

SUMMARY OF THE INVENTION

In accordance with this invention, additives are introduced into fine particle ceramic materials in the form of dried emulsions of precursors for the desired additives.

In general, the additives of this invention are produced as dried emulsions of the precursors for the selected additive. The dried emulsions are added to paints containing fine powder ceramic materials which have been processed according to any of the teachings of the above-referenced U.S. Pat. No. 4,654,075 and our parent application (issued June 7, 1988 as U.S. Pat. No. 4,749,664). The dried emulsions of the additive precursors are not converted to the selected additive until the ceramic paints are sintered into ceramic bodies.

DESCRIPTION OF THE PREFERRED EMBODIMENTS

The practice of our invention will be better understood when described with reference to a specific additive. For this purpose we choose zinc cadmium borate, $Zn_2CdB_2O_6$, which is added in small quantities (1 to 2% by wt. of the total ceramic) in our ceramic paint formulations to serve as a flux that lowers the sintering temperature. Following our emulsion technology teachings in our parent application Ser. No. 947,117 (issued June 7, 1988, as U.S. Pat. No. 4,749,664) we first prepare an aqueous solution that contains zinc, cadmium and boron in the molar ratios of 2 to 1 to 2. The zinc and cadmium can be added as either the acetates or the nitrates, and the boron is added as boric acid. The choice between acetates and nitrates will be determined by whether one wants slightly reducing conditions or slightly oxidizing conditions during burnout and sintering of the finished green ceramic parts.

To this aqueous solution is then added an oil phase, made up of Isopar G (b.p. 156°–176° at atmospheric pressure) from Exxon and an emulsifying agent OLOA-1200 from Chevron. Isopar G is a saturated hydrocarbon and is completely insoluble in the water phase. OLOA-1200 is a surfactant which is a derivative of succinimide and polybutane and has a minimum decomposition temperature of 270° C. which is above the peak temperature of emulsion heating. The two phases are mixed with a high shear mixer and homogenized in a two-stage homogenizer at a pressure of 3000 psi on the first stage and 450 psi on the second stage.

The emulsion that results from the above treatment is a dispersion of water droplets in the oil phase. Each water droplet, dispersed in this oil phase, now represents an exact aliquot of the originally prepared aqueous solution. Properly prepared original water solutions ensure that each water droplet will now contain the proper precursors for forming zinc cadmium borate $Zn_2CdB_2O_6$, and these precursors will be present in exactly the proper stoichiometric proportions. If, for example, the aqueous solution was made up with zinc and cadmium acetates and boric acid, each water droplet will contain minute amounts of these three reagents in exactly the proper molar ratio, 2 zinc, 1 cadmium and 2 boron. In short, each water droplet dispersed in the oil phase of this emulsion will exactly reflect the chemical composition of the original aqueous solution and will contain exactly the correct precursors, in exactly the correct proportions to be converted to the final product that we desire.

When our teaching of the parent application Ser. No. 947,117 (issue June 7, 1988 as U.S. Pat. No. 4,749,664) is properly practiced the characteristics of this emulsion that we first prepare will completely determine and control the particle size of the final product. Each water droplet will retain its integrity during our processing, becoming finally a particle of either final product precursors or actual final product. Moreover we can excersize considerable control of the final particle sizes by varying the number and size of the dispersed water droplets in the oil phase. This we can do by varying the concentrations of the reagents dissolved in the initial water solution, by varying the relative volumes of the oil and water phases used in preparing the emulsion, and by varying the amount of surfactant.

To assure that the emulsion characteristics do in fact determine the properties and particle size of our product we choose very mild workup conditions. The emulsion is distilled at water pump pressures (10–100 mm.) using a water bath to supply the heat. This prevents the system from ever seeing temperatures in excess of 100° C. The lowest boiling component of the emulsion is the water, and this comes off first. Removal of the water converts the emulsion from a dispersion of water solution droplets in oil to a dispersion of solid particles in oil. The size and composition of each solid particle is determined by the composition of the original aqueous solution and the nature of the emulsion. Each solid particle also contains the necessary precursors to provide our chosen product on further heating.

On further distillation the Isopar G solvent (b.p. 156°–176° C.) is removed. Our distillation conditions, a water bath for heating and a water pump vacuum, are sufficient to ensure essentially complete removal of the Isopar G. We are now left with what we call the "dried emulsion". It consists of the particles reflecting the composition of the original aqueous solution and the small amount of OLOA-1200 that was used to form the emulsion. In the case where our aqueous solution contained zinc acetate, cadmium acetate and boric acid in the correct molar proportions of 2 Zn, 1 Cd and 2 B, the particles in this dried emulsion do not contain zinc cadmium borate, but rather they contain zinc acetate, cadmium acetate and boric acid in the correct proportions to serve as precursors for forming $Zn_2CdB_2O_6$.

In the practice of the present invention these socalled dried emulsions rather than the finished, fully calcined products are added to the paints used in our "Flip Process" for preparing multi-layer ceramic capacitors. The Flip Process has been in commercial use for over twenty years as a wet process for laying down sheets of ceramic materials from a ceramic slip in the manufacture of multi-layer ceramic capacitors. "Flip" or curtain coating with a ceramic slip is described in detail by Hurley and McAdams in U.S. Pat. No. 3,717,487 issued Feb. 20, 1973.

Synthesis of cadmium zinc borate by this invention starts with the selection of precursors according to the conditions required during the burnout and sintering of the green ceramic multi-layer capacitors.

In the first example, cadmium and zinc were introduced in the form of acetates so as to provide reducing conditions during the sintering step:

Synthesis of Cadmium Zinc Borate Concentrate
(Acetate Salts)

A. Aqueous Phase Preparation

To 1.0 liters of D.I. water add:
133.30 grams Cadmium Acetate
219.90 grams Zinc Acetate
61.83 grams Boric Acid
Dilute to 1.6 liters and mix well.

B. Oil Phase Add 2.0 Kg of Surfactant, OLOA-1200, to a sufficient volume of Isopar "G" (b.p. 156° C. to 174° C.) to make 100 liters of solution. Mix well and store in a closed container.

C. Emulsification

Measure out 2.4 liters of oil phase and add the 1.6 liters of aqueous phase prepared in Step A. This addition is made while mixing with a high shear mixer. Homogenize this mixture in a two-stage homogenizer at a pressure of 3000 PSI on the first stage and 450 PSI on the second stage. In this example the mixture is passed through the homogenizer three times.

D. Distillation

Normal vacuum distillation methods are employed at pressures between 30 and 100 mm Hg. The solution temperature is normally 95° C. when 85% of the initial volume has been removed.

In another example, cadmium and zinc were introduced in the form of nitrates so as to provide oxidizing conditions for the sintering step:

Synthesis of Cadmium Zinc Borate Concentrate
(Nitrate Salts)

A. Aqueous Phase Preparation

To 150 ml of D.I. water heated to 60° C. add:
9.32 grams of Boric Acid
44.94 grams of Zinc Nitrate
23.37 grams of Cadmium Nitrate
Mix well and dilute to 300 ml and cool to 30° C.

B. Oil Phase

Add 2.0 Kg of Surfactant, OLOA-1200, to a sufficient volume of Isopar G (b.p. 156° C. to 174° C.) to make 100 liters of solution. Mix well and store in a closed container.

C. Emulsification

Measure out 700 ml of oil phase and add the 300 ml of aqueous phase prepared in Step A. This addition is made while mixing with a high shear mixer. Homogenize this mixture in a two-stage homogenizer at a pressure of 3000 PSI on the first stage and 450 PSI on the second stage. In this example the mixture is passed through the homogenizer three times.

D. Distillation

Normal vacuum distillation methods are employed at pressures between 30 and 100 mm Hg. The solution temperature is normally 95° C. when 85% of the initial volume has been removed and 110° C. when the bottoms are virtually dry.

In another example of the use of nitrates in this invention, a different emulsion phase was employed:

Synthesis of Cadmium Zinc Borate Concentrate
(Xylene Oil Phase)

A. Aqueous Phase Preparation

To 1.0 liters of D.1. water add 250 ml of 70% Nitric Acid and mix. Heat to 40° C. Then add:
93.21 grams Boric Acid
232.05 grams Cadmium Nitrate
449.35 grams Zinc Nitrate
Adjust volume to 2.0 liters, mix well.

B. Oil Phase

Add 60 grams of surfactant, OLOA-1200, to a sufficient volume of Xylene (b.p. 130° C.) to make 3.0 liters of solution.

C. Emulsification

Add the 2.0 liters of aqueous phase to the 3.0 liters of oil phase. This addition is made while mixing with a high shear mixer.

Homogenize this mixture in a two-stage homogenizer at a pressure of 3000 PSI on the first stage and 450 PSI on the second stage. In this example the mixture is passed through the homogenizer three times.

D. Distillation

Normal vacuum distillation methods were used at pressures between 30 and 100 mm Hg until a final volume of 1.0 liters was obtained.

The foregoing examples of this invention have involved the flux that is frequently used in paints for multi-layer ceramic capacitors. The dried emulsion process of this invention also provides other additives that are introduced into ceramic paints in the dried emulsion form. Additives of niobium, bismuth, and manganese were separately prepared in accordance with this invention by first making an aqueous phase of a selected precursor, then an emulsion phase, and then distillation so as to provide a dried emulsion of the precursor of the desired additive. Niobium oxalate was used as the precursor for niobium pentoxide. Manganese nitrate tetrahydrate was used as the precursor for manganese oxide. Bismuth nitrate was used as the precursor for bismuth oxide.

Where the ceramic component introduced by the dried emulsion represents 5% or less of the total ceramic composition, this does not introduce an undue burden on the system, or too much extraneous material to be removed. In the specific examples cited above we can rely on the burnout step and the sintering step on the green ceramic to convert the zinc acetate, cadmium acetate and boric acid in the particles of dried emulsion to the desired zinc cadmium borate.

It is important to note that nothing we do in preparing the ceramic paint or depositing the many ceramic layers in our multi-layer capacitors does anything that will change the particle size of our dried emulsion. It is only after burnout and during sintering that the dried emulsion losses its precursor status, becomes the desired ceramic component and in good, homogeneous mixture with the other ceramic components sinters to a dense, monolithic ceramic mass.

There are obvious advantages in using these dried emulsions where possible. All the process steps involved are mild and gentle. No high energy and high temperature steps are involved. No calcining is required. All of the process steps in preparing the dried emulsions are so mild (temperatures never in excess of 100° C) that there is no danger of reducing material such as Cd or Bi salts to the metals. The present teachings thus provide both better chemical control and significant savings in costs.

What is claimed is:

1. A dried emulsion process for introducing an additive, selected from the group consisting of cadmium zinc borate, niobium pentoxide, manganese oxide, and bismuth oxide, into fine powder ceramic multi-layer capacitor materials, said process comprising:

forming an aqueous solution of precursors of said additive;

forming an emulsion of a surfactant, a waterimmiscible fluid, and a dispersion of droplets of said solution;

distilling water and said fluid from said emulsion so as to result in a dried emulsion of said precursors; and introducing an amount greater than 0% and up to 5% by weight of said dried emulsion into fine powder ceramic materials.

2. The dried emulsion process of claim 1 wherein said ceramic materials are in paint form, and said dried emulsion is added to said paint anD is sintered with said paint so as to convert said precursors into the desired additive.

3. The dried emulsion process of claim 1 wherein said precursors are salts selected so as to provide desired reducing or oxidizing conditions for said sintering.

* * * * *